Nov. 19, 1968   E. R. NIGHTINGALE, JR   3,411,870
PURIFICATION OF CARNALLITE
Filed Jan. 28, 1966
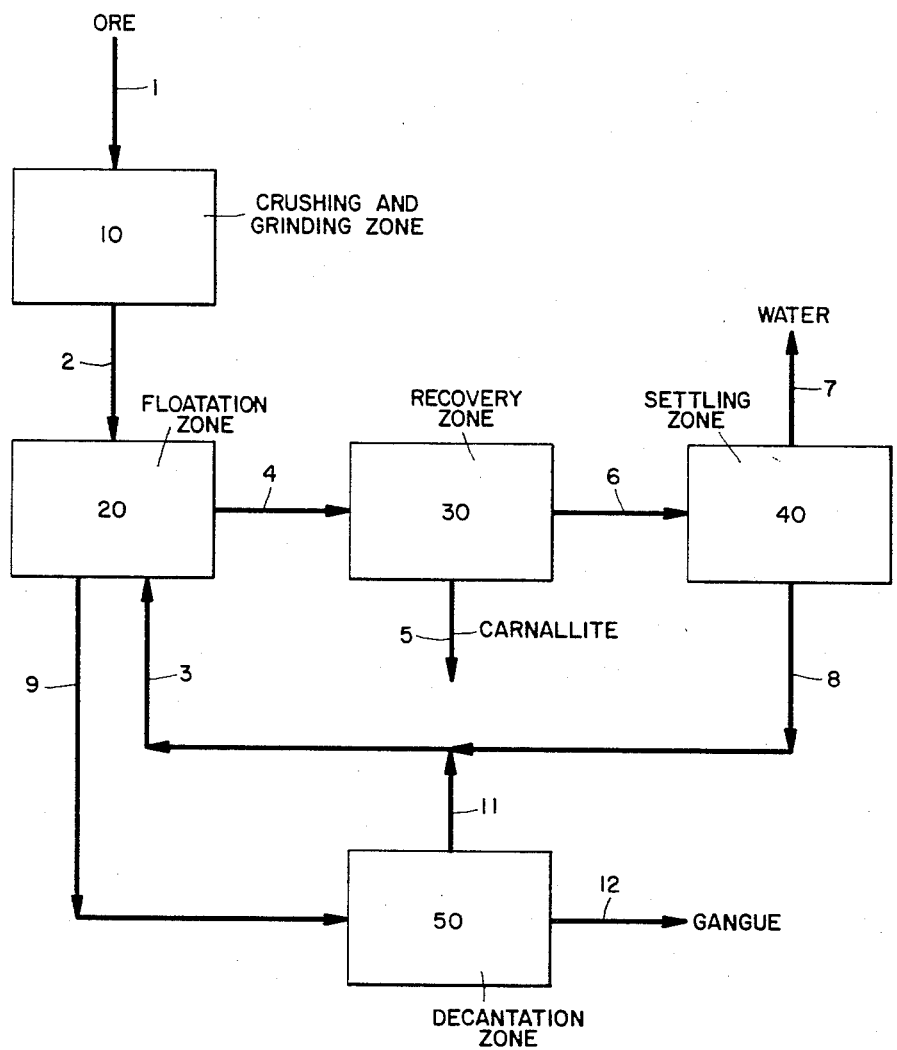
EUGENE RICHARD NIGHTINGALE, JR. INVENTOR
BY W. O. T Heilman
PATENT ATTORNEY 3,411,870
PURIFICATION OF CARNALLITE
Eugene Richard Nightingale, Jr., Murray Hill, N.J., assignor to Esso Research and Engineering Company, a corporation of Delaware
Filed Jan. 28, 1966, Ser. No. 523,735
3 Claims. (Cl. 23—91)

ABSTRACT OF THE DISCLOSURE

Process for separating carnallite from gangue and simultaneously removing water of hydration therefrom which comprises utilizing a halogenated hydrocarbon preferably in conjunction with a hydrocarbon in a flotation zone and thereafter removing the liquid including water of hydration in a recovery zone.

---

The present invention is broadly concerned with the production of magnesium from magnesium ores, particularly by means of an electrolytic cell. The invention is specifically concerned with a process for separating solid carnallite from its ore by a unique flotation procedure utilizing a liquid preferably selected from the class of halogenated hydrocarbons. The preferred halogens are chlorine, bromine, and the preferred hydrocarbons are those containing from about 1–5 carbon atoms as, for example, derivatives of methane, ethane, propane, and butane and pentane.

It is known in the art that magnesium chloride generally contains associated therewith about 6 molecules of water of hydration ($MgCl_2.6H_2O$). It is also known in the art that by general dehydration processes, such as by heating, it is possible to remove about four molecules of water of hydration without securing undesirable side reactions. However, if further dehydration is continued by known techniques in order to remove the remaining two molecules of water, undesirable side reactions occur, such as the formation of magnesium hydroxy chloride, magnesium oxide and hydrochloric acid. This is very undesirable, particularly if the magnesium chloride is to be further processed by electrolysis.

However, it is also known in the art that certain double salts of magnesium chloride, such as magnesium potassium chloride ($MgCl_2.KCl.6H_2O$), or carnallite, are easily dehydrated by heating without the occurrence of undesirable side reactions. However, the product of this dehydration, an equimolar mixture of anhydrous magnesium and potassium chlorides, is not satisfactory for further processing, as by electrolysis, to produce magnesium metal due to its very high content of potassium chloride. This is especially true in the case of naturally occurring carnallite which, in addition to the potassium chloride combined with the magnesium chloride, also contains other salts such as an excess of potassium chloride, sodium chloride, calcium chloride, magnesium sulfate, etc., as well as other impurities, such as gangue, clay, sand, stones, etc.

As pointed out heretofore, the present invention is concerned with the separation of solid carnallite ($KCl.MgCl_2.6H_2O$) from the rest of its ore and associated impurities which can then be dehydrated for the preparation of anhydrous magnesium chloride or magnesium oxide. Carnallite is appreciably less dense than the sylvite (KCl), halite (NaCl), kieserite ($MgSO_4.H_2O$), and silicateous material with which it is usually associated in naturally occurring ores. The carnallite is separated by flotation utilizing a liquid, such as dibromoethane or mixtures of dichloroethane and dibromoethane to remove the carnallite from the other minerals and associated impurities. The preferred liquid is a mixture of halogenated hydrocarbons with or without a hydrocarbon diluent, insoluble in aqueous salt solutions, such that the specific gravity of the organic phase is greater than that of carnallite (sp. gr. 1.60) and of the order of between 1.61 and 1.95.

The process of the present invention may be readily understood by reference to the figure illustrating one adaptation of the same. The carnallite ore as mined is introduced into the crushing and grinding zone 10 by means of line 1. The ore is ground sufficiently to liberate the carnallite particles from its associated gangue and should not be ground finer than about 120 mesh to prevent foaming and emulsion formation which interferes with the flotation separation. It is preferred that the grinding operation produce 80% to 90% by wt. of the material in the range from 20 to 40 mesh size such as about 30 mesh. The ground ore is introduced by means of line 2 with stirring into flotation chamber 20. The organic flotation liquor is introduced into flotation zone 30 by means of line 3. The carnallite ore is separated from its gangue in zone 20 using conventional flotation separation techniques. The supernatant carnallite ore is removed from zone 20 by means of line 4 and introduced into hydrocarbon recovery zone 30. It is preferred that ambient temperature and pressure be used to accomplish the flotation separations in zone 20 although slightly elevated temperatures may be utilized if desired.

The organic flotation liquor is comprised of mixtures of halogenated hydrocarbons, preferably diluted with an inert hydrocarbon, such as kerosene or the like. The specific gravity of the organic phase is between 1.65 and 1.95, preferably about 1.8. Preferred media are mixtures of dibromoethane and kerosene, or hexachloroethane and kerosene, or dichloroethane and dibromoethane.

The organic-carnallite slurry is introduced into hydrocarbon recovery zone 30 which is maintained at a temperature suitable to vaporize traces of the hydrocarbon retained by the carnallite ore. The temperature in zone 30 is, for instance, between 100° and 250° C. The pressure in zone 30 is subatmospheric or atmospheric. It is preferred that the temperature in zone 30 be such that the carnallite ore is partially dehydrated to remove from about 2 to 4 molecules of water of hydration. Following volatilization of the organic liquor from the carnallite, the ore is removed by means of line 5 for further processing, such as by roasting to completely dehydrate the same. The organic liquid together with water of hydration removed in zone 30 is removed from zone 30 by means of line 6, condensed and introduced into settling chamber 40. The supernatant aqueous phase is removed by means of line 7 and rejected. The organic phase is removed from zone 40 by means of line 8 and recycled to the flotation zone 20 by means of line 3.

The gangue materials rejected by the flotation separation are removed from zone 20 by means of line 9 and introduced into separation zone 50. Any organic solvent adsorbed by the gangue is separated and removed from zone 50 by means of line 11 for recycle to flotation zone 20. The gangue materials are removed from zone 50 by means of line 12 and may be further processed for the recovery of byproducts such as potash, sodium chloride, and the like, if desired. The pressure in zone 50 is subatmospheric or atmospheric. Temperature in zone 50 is from ambient to about 250° C., and other means may be employed to remove the last traces of organic liquor from the gangue materials such as, for instance, the steam stripping of the organic phase from the gangue followed by the recycling of the steam-stripped organic liquor to zone 20.

Depending upon the separation techniques employed, the concentration of the ore slurry in flotation separation zone 20 may vary from 10 lbs. of ore per 100 lbs. of solvent, to 100 lbs. of ore per 100 lbs. of solvent, preferably from 50 lbs. of ore per 100 lbs. of solvent, to 100 lbs. of ore per 100 lbs. of solvent. As pointed out heretofore, the preferred solvents are halogenated hydrocarbons wherein the hydrocarbon has from about 1 to 5 carbon atoms. A very desirable solvent is a mixture of dichloroethane and dibromoethane. The solvent mixtures should be adjusted to have a specific gravity in the range from about 1.61 to 1.95, preferably to have a specific gravity in the range from about 1.76 to 1.80.

The present invention may be more fully understood by the following example illustrating an adaptation of the same wherein three runs produced excellent recovery of the carnallite ore from a mixture of carnallite, silvite, halite, and gangue.

TABLE I

[Solvent Composition: $C_2H_4Cl_2 + C_2H_4Br_2$]

| | Sp. Grav. 1.68 | Sp. Grav. 1.78 | Sp. Grav. 1.88 |
|---|---|---|---|
| Supernatant ore, as fraction of total ore, percent | 64 | 66 | 62 |
| Composition of supernatant ore, percent: | | | |
| $MgCl_2 \cdot KCl \cdot 6H_2O$ | 98.9 | 99.6 | 99.1 |
| NaCl | 0.7 | 0.14 | 0.9 |
| Miscellaneous | 0.4 | 0.26 | Nil |
| Mg recovery in supernatant ore, as fraction of Mg in total ore, percent | 92.5 | 94.4 | 92.8 |

In these examples, samples of 20 to 60 mesh ore were treated with solvent to composition and specific gravity as shown. The supernatant ore was removed and the composition of the original ore, the supernatant ore, and the rejected gangue were analyzed. From the above data, it is apparent that excellent results are secured. The supernatant ore is essentially pure carnallite. The small loss in magnesium values in this ore was due primarily to the presence of kieserite in the ore. Since the mineral carnallite is rarely associated with other minerals whose specific gravity is less than about 1.95, the present invention provides a simple, rapid method for separating carnallite from the other minerals with which it is usually associated.

What is claimed is:

1. Process for the production of relatively pure carnallite ore from gangue which comprises grinding a mined carnallite ore to produce more than 75% by weight of the same to a fineness in the range from about 10 to 80 mesh, thereafter contacting the ground ore in a flotation zone with a halogenated hydrocarbon separation liquid selected from a class consisting of chlorine or bromine containing from about 1 to 5 carbon atoms in the molecule, said liquid having a specific gravity in the range from about 1.61 to 1.95, separating liquid and relatively pure carnallite ore from the flotation zone and passing the same to a recovery zone maintained at a temperature in the range from about 100° C. to 250° C., removing said halogenated hydrocarbon and water of hydration as a vaporous product, thereafter condensing said vaporous product and separating the supernatent aqueous phase from the halogenated hydrocarbon, recycling said halogenated hydrocarbon to said flotation zone, removing carnallite from said recovery zone and thereafter removing the remaining water of hydration therefrom.

2. Process as defined by claim 1 wherein gangue and liquid is removed from said flotation zone and passed to a decantation zone wherein the gangue is separated from said liquid which is recycled to said flotation zone.

3. Process as defined by claim 1 wherein a hydrocarbon boiling in the range from about 200° F. to about 400° F. is utilized with said mixture of dichloroethane and dibromoethane.

References Cited

UNITED STATES PATENTS

| 1,875,013 | 8/1932 | Kaselitz | 23—91 XR |
| 2,150,917 | 3/1939 | Foulke et al. | 209—172 |
| 3,181,930 | 5/1965 | Olsen | 23—91 |
| 3,282,642 | 11/1966 | Goodenough et al. | 23—91 |
| 3,331,504 | 7/1967 | O'Connell et al. | |

OSCAR R. VERTIZ, *Primary Examiner.*

EDWARD STERN, *Assistant Examiner.*